United States Patent
Friedrich

(10) Patent No.: US 9,127,644 B2
(45) Date of Patent: Sep. 8, 2015

(54) WIND TURBINE AND AN ASSOCIATED CONTROL METHOD

(75) Inventor: Michael Friedrich, Silkeborg (DK)

(73) Assignee: Envision Energy (Denmark) ApS, Silkeborg (DK)

(*) Notice: Subject to any disclaimer, the term of this patent is extended or adjusted under 35 U.S.C. 154(b) by 816 days.

(21) Appl. No.: 13/364,521

(22) Filed: Feb. 2, 2012

(65) Prior Publication Data

US 2012/0201675 A1  Aug. 9, 2012

(30) Foreign Application Priority Data

Feb. 4, 2011 (DK) ................................ 2011 70066

(51) Int. Cl.
*F03D 1/02* (2006.01)
*F03D 7/02* (2006.01)

(52) U.S. Cl.
CPC ............ *F03D 7/0228* (2013.01); *F03D 7/0268* (2013.01); *Y02E 10/721* (2013.01); *Y02E 10/723* (2013.01)

(58) Field of Classification Search
CPC ........................... F03D 7/0228; F03D 7/0268
USPC ........... 416/1, 23, 37, 99, 141, 142, 147, 155, 416/194, 196 A, 196 R; 290/44, 55
See application file for complete search history.

(56) References Cited

U.S. PATENT DOCUMENTS

| | | | |
|---|---|---|---|
| 4,297,076 A * | 10/1981 | Donham et al. | 416/37 |
| 4,355,955 A * | 10/1982 | Kisovec | 416/23 |
| 5,527,151 A | 6/1996 | Coleman et al. | |
| 6,876,099 B2 * | 4/2005 | Wobben | 290/44 |
| 7,242,107 B1 * | 7/2007 | Dempster | 290/55 |
| 7,713,028 B2 * | 5/2010 | Liao | 416/194 |
| 7,909,575 B2 * | 3/2011 | Barbu et al. | 416/61 |
| 7,914,261 B2 | 3/2011 | Wobben | |
| 7,939,961 B1 * | 5/2011 | Bonnet | 290/55 |
| 7,994,650 B2 * | 8/2011 | Stommel | 290/44 |
| 2009/0148291 A1 | 6/2009 | Gerber et al. | |

FOREIGN PATENT DOCUMENTS

| | | |
|---|---|---|
| CN | 101451491 A | 6/2009 |
| DE | 31 26 677 A1 | 1/1983 |
| DE | 10 2009 023 001 A1 | 12/2010 |
| EP | 0 709 571 A2 | 5/1996 |
| EP | 0 709 571 A3 | 12/1996 |
| NL | 193070 | 5/1998 |

* cited by examiner

*Primary Examiner* — Nathaniel Wiehe
*Assistant Examiner* — Woody A Lee, Jr.
(74) *Attorney, Agent, or Firm* — Roberts Mlotkowski Safran & Cole, P.C.; David S. Safran

(57) ABSTRACT

A two-bladed partial-pitch wind turbine and a method of controlling such a wind turbine during high wind conditions are described. The turbine is operable to pitch the outer sections of the turbine rotor blades during extreme wind conditions (i.e., high wind loads) such that the outer blade sections are substantially orthogonal to the inner blade sections. This arrangement acts to reduce the extreme thrust loading experienced by the wind turbine structure during severe gusts (e.g., during hurricane or typhoon conditions), and accordingly reduces the risk of damage to the wind turbine in such conditions.

16 Claims, 8 Drawing Sheets

WIND TURBINE AND AN ASSOCIATED CONTROL METHOD

FIELD OF THE INVENTION

The present invention relates to a wind turbine and a method of controlling said wind turbine, in particular during an extreme wind condition.

BACKGROUND OF THE INVENTION

A considerable problem in the area of wind turbines is that of damages caused to wind turbine structures during periods of high loading due to extreme wind conditions. As wind turbine blades are normally prevented from rotating in such conditions, the peak lift forces or peak drag forces which are experienced by wind turbine blades during high wind loads are transferred to the wind turbine tower structure, resulting in considerable stresses and strains experienced by the structure itself.

The lift force L produced by an airfoil in a specific airflow condition is related to the area of the airfoil and to the angle of attack of the oncoming airflow (i.e. the angle between the chord line of an airfoil and the vector line of the oncoming airflow) by the following formula:

$$L = \frac{1}{2} \rho v^2 A C_L$$

where $\rho$ is the air density, $v$ is the true airspeed, $A$ is the planform area, and $C_L$ is the lift coefficient for the angle of attack of the incoming air. The drag force for an airfoil is produced by a similar formula, where $C_L$ is replaced by $C_d$, the drag coefficient.

With reference to FIG. 1, the lift coefficient (indicated by the dashed line) and the drag coefficient (solid line) are shown for a standard airfoil, plotted against different angles of attack. As can be seen from the graph, for a standard airfoil shape the maximum lift force generally occurs at an angle of attack of the oncoming wind of approximately 15°-20°. The maximum drag force occurs at an angle of attack of approximately 90°.

With reference to FIG. 2, a pair of illustrative drawings of a wind turbine blade 10, tower 12, and nacelle 14 are shown, demonstrating the high loads which are experienced during extreme wind conditions (for ease of reference, the blade 10 is shown as being in line with the tower structure 12). In FIG. 2(a), the angle of attack (AoA) of the oncoming airflow 16 is approximately 15°-20°. Accordingly, the blade 10 experiences a maximum lift force in the direction indicated by arrow 18. Such a lift force 18 on the blade 10 transfers into a thrust loading on the wind turbine nacelle 14, and subsequently on the tower 12, indicated by arrow 20.

Similarly, in FIG. 2(b), when the oncoming wind (indicated by arrow 22) has an angle of attack (AoA) of approximately 90°, the blade 10 experiences a maximum drag force in the direction indicated by arrow 24. This drag force 22 then results in a corresponding thrust loading on the tower 12 as indicated by arrow 26. Such thrust loading forces 20, 26 contribute greatly to the stresses and strains experienced by a wind turbine structure, and may result in damage or structural failure of the wind turbine when in extremely hazardous loading conditions.

A top plan view of a standard two-bladed wind turbine is indicated in FIG. 3 at 28. The wind turbine 28 comprises a tower 30, turbine nacelle 32 positioned at the top of the tower 30, and a pair of wind turbine blades 34 extending in opposite directions from a hub 33 provided at said nacelle 32. When a two-bladed turbine 28 is stopped rotating (e.g. during an extreme wind condition), the two blades 34 will generally settle into a steady-state horizontal alignment, as indicated in FIG. 3. As described relating to the diagrams in FIG. 2, any strong wind loads (indicated by arrow 36) will act on the entire span of the blades 34, resulting in a corresponding lift or drag force 38 on the blade 34. Such forces 38 acting along the length of the blade 34 result in a cumulative thrust force 40 acting on the turbine nacelle 32 and tower 30, which determines the design load which is set for such a turbine to ensure adequate operation. Any winds in excess of such speeds may result in damage to the turbine structure 28. A perspective view of the forces acting on one of the wind turbine blades 34 is illustrated in FIG. 4. An example of a known three-bladed partial pitch turbine can be seen in US Patent Application Publication No. 2009/0148285 and in 2009/0148291.

US 2009/0148291 disclose a wind turbine having a rotor with three blades. Said rotor with three blades will never be able to find a neutral position in the wind during an extreme wind condition. Therefore it is very common to control the wind turbine in a manner where the outer most part of the blades will be pitched to a feathered position, but as the innermost part of the blades is fixed, this part can not be pitched. In an extreme wind condition the inner blade parts of US 2009/0148291 has the function to guide the wind around the nacelle and in order to do that, the rotor needs to be aligned into the wind. This can only be done by performing a control of the yawing system of the wind turbine, as when the turbine is coupled to the grid and producing power. By operating and controlling the yaw system, the angle of attack is controlled and the wind will be guided around the nacelle. Operating a wind turbine according to US 2009/0148291 will minimize the loads from an extreme wind condition on the outer blades and thus also on the tower and on the foundation, but there will still be some heavy loads from the inner blade parts as they are subject to the full extreme wind load. Further this system will only work as long as it is possible to operate and control the yaw system, which normally can be a problem during extreme wind situations as the wind turbines most often will be decoupled from the grid. If a wind turbine as disclosed in US 2009/0148291 is not controlled and operated into a certain direction in relation the wind direction, very large and unwanted loads will occur. This is actually very crucial as the direction of the wind very often will be changing rapidly and also radically during an extreme wind condition such as a storm or a typhoon. A wind turbine yaw system will not be fast enough to follow such rapid changes in the wind direction and thus very large loads will have to be dealt with.

The International Electrotechnical Commission (IEC), which maintains the standards body for wind turbine design ratings, defines extreme wind conditions as wind shear events, as well as peak wind speeds due to storms and rapid changes in wind speed and direction (www.iec.ch).

If each entire blade 10, 34 of a wind turbine experiences peak lift/drag forces, as such forces are proportional to the square of the wind velocity the subsequent thrust forces experienced by the wind turbine structure 12, 14 or 30, 32 can be significant. For example, IEC Class I turbines must be rated to withstand extreme gusts of 70 meters per second (m/s). It is the constraints of meeting such ratings requirements that force wind turbine manufacturers to design wind turbine structures which are capable of withstanding such loads, e.g. through the use of additional reinforcement materials. Such design features contribute towards the relatively high construction costs of wind turbines.

It is an object of the invention to provide a method of controlling a wind turbine in extreme wind conditions which decreases the effect of loads experienced by the wind turbine structure, and accordingly reduces the costs associated with wind turbine production, as well as the risk of damage to the wind turbine.

SUMMARY OF THE INVENTION

Accordingly, there is provided a method of controlling a partial-pitch wind turbine during an extreme wind condition, the wind turbine comprising a wind turbine tower, a wind turbine foundation and at least two wind turbine blades installed on a rotor at a nacelle, said wind turbine comprising a yaw system for yawing said rotor in relation to a wind direction, said yaw system being installed between said nacelle and said tower, wherein said at least two wind turbine blades comprise a first blade section and a second blade section, said second blade section pitchable relative to said first blade section, the method comprising the step of:

- for an extreme wind condition, locking said yaw system and pitching said second blade sections of said wind turbine rotor blades such that said second blade section is pitched at a substantially orthogonal pitch angle to said first blade section to reduce the magnitude of the extreme loading experienced by the wind turbine tower and foundation, wherein said step of pitching is arranged such that the force generated on said second blade section by the oncoming wind is substantially equal in magnitude but orthogonal in direction to the force generated on said first blade section by the oncoming wind.

By using a partial pitch wind turbine and orienting the pitchable sections of the blades substantially at right angles to the pitch angles of the inner sections of the blades, it is possible to distribute the high loads experienced by the wind turbine structure more evenly. As the sections are substantially perpendicular to one another, the oncoming wind will produce forces in the blades acting in different directions. As the force acting on the wind turbine structure is a vector force based on a combination of the forces experienced by the different blade sections, accordingly, the resultant thrust loading experienced by the wind turbine structure, in particular the wind turbine tower and foundation, will be reduced, relative to the high loading experienced by traditional full-pitch systems. The pitching is arranged such that the magnitude of the orthogonal forces acting on the blade sections are approximately equal, so that the resultant thrust loading on the wind turbine tower and foundation is minimised.

Through the use of this method, the magnitude of the extreme loads experienced by the partial pitch wind turbine structure during high winds can be reduced to up to approximately 60% of the magnitude of extreme loads which would be experienced by a full pitch blade wind turbine. An advantage of this approach is that the wind turbine structures and foundations can be designed for the reduced load figures, with corresponding re-dimensioning of tower components, foundations, etc., which can result in reduced construction and material costs for the wind turbine.

Dependent on the prevailing wind conditions in a region, the design considerations of the wind turbine structure may be altered accordingly. By an extreme wind condition, it will be understood that this refers to very high wind speeds which can occur in the vicinity of the wind turbine tower, and for which said wind turbine towers and foundations must be designed to cope with adequately. In particular, the International Electrotechnical Commission (IEC) specifies extreme wind conditions as wind shear events, as well as peak wind speeds due to storms and rapid changes in wind speed direction. A wind turbine is expected to withstand extreme wind conditions of a specified wind speed to qualify as a particular class of IEC turbine (for example, an extreme wind of 70 m/s wind speed is currently specified for an IEC Class I turbine).

It will be understood that the definition of such extreme wind conditions may depend on several factors, e.g. the maximum wind speed rating for the desired class of wind turbine, and/or the wind speed which would be classified as a once in 10/50/100 years event (relative to the normal prevailing wind conditions at the wind turbine site).

A very important issue that is addressed with a wind turbine and a method of controlling a wind turbine according to the invention is that even though the wind is changing directions rapidly and gusts appear the wind turbine is designed to cope with such conditions. As the yaw system of the wind turbine is locked and as the rotor is free to idle, the rotor will always be able to relieve itself from the loads induced by the wind. Due to the fact that the second/outer blade section is pitched in relation to the first/inner blade section the rotor will not be rotating with a noticeable speed but it will only be idling or moving slightly back and forth with a very slow speed when the wind direction is facing the front of the rotor plane.

The relative position of the blade sections of the rotor has the influence that the rotor will relieve itself no mater from which direction the wind is acting on the blades and there will never be one single wind direction where a worst case scenario will occur. The forces generated on the blades will always be split into forces having different directions and thus the resultant force will be minimised.

One wind direction will perhaps put loads on the first section of the blades, producing drag and the load on the second section of the blade will produce some kind of lift that will have a tendency to idle the rotor a bit. Such an idling rotation is to some extend allowable and it will be minimised by counter acting forces on another blade section on the same or on another blade on the rotor. Another wind direction will perhaps be loading a second section to produce a drag and a lift on the first section, but again the different sections on the different blades will act to minimise the loads by mainly relieving them and by coping only a small part of the loads. A situation with a two bladed wind turbine where the yaw system is locked and the rotor is in a more or less horizontal position and pointed against the most likely wind direction, will allow the wind turbine structure to experience the lowest possible loads from an extreme wind condition such as a typhoon with a wind speed of 40 to 70 m/s or even more. If such a rotor with two blades is pointed against the wind, the rotor will act as a wind vane and hold its position and will only move slightly up and down (idling slightly back and forth).

For most regions in Europe, a wind speed of greater than 20 meters per second (m/s) may be regarded as an extreme wind condition. Therefore, a wind turbine structure for such a location may be configured such that said step of pitching occurs for winds in excess of 20 m/s, the wind turbine structure designed according to such a wind speed rating.

However, in typhoon- or hurricane-prone regions in Asia, such a turbine may need to be rated to withstand winds of up to 70 m/s. Thus, the design of the turbine structure may involve more use of reinforcement elements. For such a reinforced turbine, an extreme wind condition may be at a higher level than in the case of a European-based turbine. In general, a weather system comprising sustained winds of at least 33 meters per second (or 119 km/hour) is classified as a typhoon or hurricane.

Preferably, said step of pitching is arranged such that the surface area of said first blade section is substantially equal to the surface area of said second blade section.

The lift force is proportional to the surface area of the airfoil being acted upon. As the pitching is arranged such that the surface areas of the pitched and unpitched sections are substantially equal, this will result in an equal distribution of lift forces between the pitched and unpitched sections of the rotor blades, evenly spreading the effects of such forces throughout the rotor blades structure. This ensures that the resultant thrust loading on the wind turbine tower and structure is minimised. As the thrust loading is minimised, this means that the constructional requirements of the wind turbine may be tailored to accommodate the reduced loading, with a subsequent reduction in wind turbine cost.

Preferably, said step of pitching is performed when the wind speed exceeds approximately 25 m/s.

In one embodiment, the wind turbine has a wind limit of approximately 25 m/s, and when experiencing winds at or above this level the turbine will stop and initiate the appropriate safety procedure to withstand extreme wind loads. It will be understood that the step of pitching may also be performed in advance of extreme wind conditions at a wind turbine, e.g. based on a likely weather forecast.

Preferably, said step of pitching is performed such that each of said second blade sections are simultaneously pitched to be substantially orthogonal to said first blade sections.

As the pitching of the blade sections is synchronised, this means that the rotor blades are balanced during the pitching operation.

Preferably, the method further comprises the step of stopping the rotation of said wind turbine blades.

At high wind speeds, the power of the wind may exceed the rated limits of the wind turbine structure, as well as the maximum rated power of the electrical generator of the turbine. Accordingly, when high wind speeds are detected, the rotor blades are stopped to prevent damage to the wind turbine. Preferably, said step of stopping is performed when the wind speed at the turbine exceeds 25 m/s.

Preferably, said step of stopping comprises pitching said second blade sections to a feathered position.

By a feathered position it is meant that the blade section is rotated to be parallel to the oncoming airflow. Feathering of the second blade sections reduces the lift force generated by the wind on the blades, and gradually reduces the rotational power of the blades, eventually bringing the rotor blades to a stop. Once the rotor blades have been stopped, or reduced to a relatively low speed of rotation, the second blade sections may be pitched to be substantially orthogonal to the first blade sections. Once the blades are in the feathered position and the yaw system is locked the second blade sections will not necessary be parallel to the oncoming airflow as the wind direction might change.

Preferably, the method further comprises the step of letting the wind turbine rotor blades idle and e.g. applying a brake to the wind turbine, to impede the rotation of the wind turbine blades.

In a preferred embodiment of the invention such a brake can be applied but still the rotor will be able to idle or move to relieve stresses as the forces from the wind is acting on the different parts of the rotor.

Such a brake may be a mechanical or electrical brake. The brake may be operable to fully stop the rotation of the turbine, or it may at least provide resistance to rotation of the blades.

Preferably, said step of pitching comprises rotating said second blade sections such that the pitch angle between the second blade sections and the first blade sections is between 80°-100°.

As the first and second blade sections are substantially at right angles to one another, this results in a considerable reduction in the resultant thrust force experienced by the wind turbine structure, as the thrust force will be a vector product of the forces experienced by the different sections, and is not simply the cumulative effects of such forces. It will be understood that the second blade sections may be locked in said relatively orthogonal position for the duration of the extreme wind conditions. Additionally or alternatively, minor adjustments may be made to the relative pitch angle between the blade sections in order to improve load distribution throughout the wind turbine structure.

Preferably, the method further comprises the step of iteratively adjusting the pitch angle of said second blade section subsequent to said pitching step, to minimise the magnitude of the extreme loading experienced by the wind turbine during an extreme wind condition.

It will be understood that, as the wind turbine is experiencing an extreme wind condition, further minor adjustments may be made to the relative pitch angle between the first section and the second section, in order to account for adjustments in wind direction, wind speed, and/or blade section loading. As said step is repeated iteratively, the pitch of the second section may be continually adjusted to ensure that the loads produced by the extreme wind conditions are distributed evenly over each of the blade sections.

Preferably, the method further comprises the step of monitoring the loading experienced by the wind turbine structure, and wherein said pitch angles are adjusted based on said monitored loading. Preferably, said step of monitoring comprises monitoring the loading experienced by a wind turbine tower.

Preferably, the method further comprises the step of monitoring the loading experienced by at least one of said blade sections, and wherein said pitch angles are adjusted based on said monitored loading.

By using load sensors in the wind turbine tower, and/or on the different blade sections, the loading effects on the different sections of the wind turbine structure and blades can be monitored, and the pitch angles of the second sections adjusted accordingly. This allows for the loading on the blades to be adjusted dependent on the resultant forces experienced by the overall wind turbine structure, and also allows for the loading to be evenly distributed throughout all the sections of the blades, even when the wind conditions undergo changes which would ordinarily affect such distribution of loads. This ensures that the thrust loading experienced by the wind turbine structure is maintained at a minimum. It will also be understood that the method further comprises the step of monitoring the wind speed and/or the wind direction at the wind turbine, wherein said pitch angles are adjusted based on said monitoring.

Preferably, said step of adjusting is a closed-loop feedback system, wherein the feedback signal for said closed-loop system is said monitored loading of said blade sections. The use of a closed-loop feedback system provides for stable operation of the device, and the subsequent adjustment of the pitch angles may be fine-tuned dependent on the measured loading.

Preferably, the method is further operable to pitch said second blade sections out of said substantially orthogonal pitch angle to said first blade sections once said extreme wind condition has passed.

Once the extreme wind condition is over and the wind speeds and associated turbine loading has reduced to manageable levels, and provided no additional maintenance and/or repair work is required at the turbine or the power grid, the second blade sections may be pitched back to normal operating positions relative to said first sections, and the turbine operation and power generation can be recommenced.

Preferably, said step of pitching comprises rotating said second blade section such that the pitch angle between the second blade section and the first blade section is approximately +90°. Alternatively, said pitch angle is approximately −90°.

Preferably, the method comprises the step of monitoring environmental conditions in the region of said wind turbine. Preferably, said step of pitching is responsive to a forecast of an extreme wind condition at said wind turbine:

It will be understood that the term "in the region of" the wind turbine covers locations directly adjacent to the wind turbine location, but said region may extend to approximately 100-1,000 km from the wind turbine location, so that approaching weather systems which may damage the wind turbine can be detected and/or predicted from monitoring stations located remote from the wind turbine location.

There is further provided a partial-pitch wind turbine having at least two wind turbine rotor blades operable to implement the steps of the above method.

Preferably, there is provided a partial-pitch wind turbine having at least two wind turbine rotor blades with a length of at least 35 meters, the wind turbine comprising:
 a wind turbine tower provided on a wind turbine foundation;
 a wind turbine nacelle provided at an upper end of said tower;
 a hub provided at said nacelle;
 at least two wind turbine rotor blades, said rotor blades being installed on a rotor at the nacelle and comprising a first blade section and at least one second blade section;
 a yaw system for yawing said rotor in relation to the wind direction, said yaw system being installed between said nacelle and said tower; and
 a pitching system operable to pitch said second blade sections relative to said first blade sections, wherein the wind turbine further comprises a control system coupled to said pitching system, said control system further being coupled to said yaw system, said control system operable to reduce the magnitude of the extreme loading experienced by said wind turbine tower and foundation by locking said yaw system and by pitching said second blade sections at a substantially orthogonal pitch angle to said first blade sections for an extreme wind condition, such that the force generated on said second blade section by the oncoming wind is substantially equal in magnitude but orthogonal in direction to the force generated on said first blade section by the oncoming wind.

As the wind turbine is controlled to pitch the second sections of the rotor blades into an orthogonal relationship with the first blade sections during high wind conditions, this results in a reduction in the extreme thrust loads experienced by the wind turbine structure. As the control system is operable to control the pitching such that the substantially orthogonal forces on the different blade sections have substantially the same magnitudes, this means that the resultant force vector acting on the wind turbine structure will be minimised.

In one embodiment, the wind turbine is a two-bladed partial-pitch wind turbine. In another embodiment, the wind turbine is a three-bladed partial-pitch wind turbine. Preferably, the controller is operable to pitch each outer blade section such that each of said outer blade sections is substantially orthogonal to the respective inner blade extenders section during an extreme wind condition.

Preferably, said wind turbine rotor blades are configured such that the surface area of said first blade section and the surface area of said second blade section is substantially equal. Preferably, the surface area of each blade section of the wind turbine is substantially equal.

An equal surface area of each of the sections of the rotor blades ensures that each section experiences an equal amount of force, thus evenly distributing the loads experienced by the rotor blades throughout the rotor span. As the forces are evenly distributed between the different rotor blade sections, this provides for an optimum balancing of the loads in the wind turbine, and the resultant thrust loading experienced by the greater wind turbine structure (which will be a vector product of the orthogonal loads) will be minimised. As this thrust loading is minimised, the constructional requirements of the turbine can be adjusted accordingly, and the cost and materials required for wind turbine and foundation construction can be kept to the minimum required.

Preferably, said first section is a stall-controlled wind turbine blade section and said second section is a pitch-controlled wind turbine blade section.

The use of a combined stall-controlled and pitch-controlled rotor blade results in the advantages of both types of wind turbine blade design for a single wind turbine blade.

Preferably, said first section comprises an inner blade extender section coupled to said hub and said second section is an outer pitchable blade section coupled to the distal end of said inner blade extender section.

Preferably, said rotor blades are configured such that said inner blade extender section forms between 20%-50% of the length of said rotor blade. Further preferably, said inner blade extender section forms approximately ⅓ of the length of said rotor blade.

Preferably said pitching system comprises a separate pitching apparatus for each blade, said pitching apparatus operable to pitch the first blade section of said respective rotor blade relative to the second blade section of said respective rotor blade. For example, in the case of a two-bladed partial pitch turbine, preferably said pitching system comprises a first pitching apparatus operable to pitch a first outer blade section relative to a first inner blade extender and a second pitching apparatus operable to pitch a second outer blade section relative to a second inner blade extender. Preferably, each of said pitching apparatus is provided at the interface between said first blade section and said second blade section of the respective rotor blades.

Preferably, the wind turbine further comprises at least one load sensor provided in said wind turbine tower wherein said control system is operable to adjust the pitch angles of said second blade sections relative to said first blade sections during an extreme wind condition based on the output of said at least one load sensor to reduce the magnitude of the extreme loading experienced by the wind turbine.

It will be understood that further load sensors may be provided in other sections of the wind turbine structure, e.g. the nacelle, the hub, etc.

Preferably, the wind turbine further comprises at least one load sensor provided in said first and second blade sections, wherein said control system is operable to adjust the pitch angles of said second blade sections relative to said first blade sections during an extreme wind condition based on the output of said at least one load sensor to reduce the magnitude of the extreme loading experienced by the wind turbine.

The use of load sensors throughout the wind turbine structure and blades allows for detailed fine-tuning of the pitch angles of the blade sections, in order to better distribute the loading experienced by the wind turbine.

Preferably, the wind turbine further comprises a yawing system, wherein said control system is operable to yaw said nacelle, hub, and rotor blades into the wind during an extreme wind condition.

Preferably, the turbine further comprises at least one wind direction sensor coupled to said controller, said controller operable to yaw said nacelle, hub, and rotor blades based on the output of said wind direction sensor.

Preferably, said wind turbine further comprises a brake operable to impede rotation of said at least one rotor blade, but still letting the rotor idle if wanted.

The use of a brake for the rotor of the wind turbine prevents unnecessary rotation of the rotor blades during an extreme wind condition. Preferably said brake is a mechanical brake and/or an electrical brake.

Preferably, the wind turbine is an off-shore wind turbine, and wherein said wind turbine foundation is chosen from one of the following: a mono pile foundation; a tripod foundation; a gravity foundation; a suction foundation.

As the cost of off-shore turbine foundations are often one of the largest considerations for off-shore turbines, any opportunity to reduce the construction requirements and costs is welcome. Accordingly, the invention provides a considerable advantage in this area, as the foundations of an off-shore turbine may be re-dimensioned and optimised for the reduced foundation loads experienced by an off-shore turbine according to the invention.

DESCRIPTION OF THE INVENTION

An embodiment of the invention will now be described, by way of example only, with reference to the accompanying drawings, in which.

Figure 5:
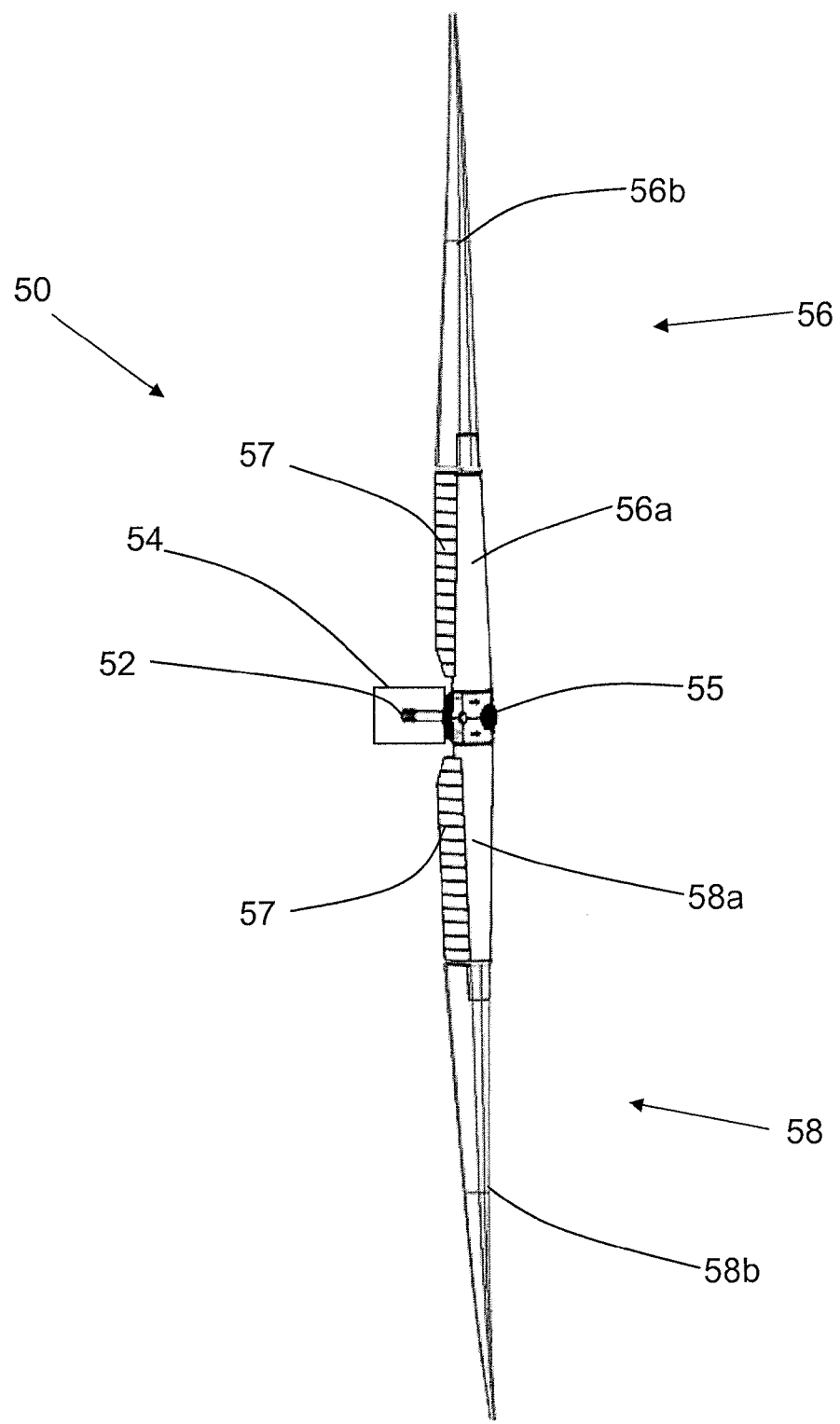
FIG. 5 is a top plan view of a two-bladed partial-pitch wind turbine according to the invention.

With reference to FIG. 5, a two-bladed partial-pitch wind turbine according to the invention is indicated generally at 50. The wind turbine 50 comprises a tower 52 which is provided in a wind turbine foundation (not shown), a nacelle 54 provided at the top of said tower 52, and first and second wind turbine blades 56, 58 extending from opposite sides of a hub 55 provided at said nacelle 54. The blades 56, 58 and the hub 55 are coupled to a shaft and an electrical generator (not shown). In normal operation, said blades 56, 58 are operable to be rotated by the oncoming wind, thereby rotating the shaft and producing electricity in the generator.

The wind turbine blades 56, 58 are of a partial-pitch design, wherein each blade 56, 58 comprises an inner blade extender section 56a, 58a and an outer blade section 56b, 58b. The inner blade extender sections 56a, 58a extend from the wind turbine hub 55. The outer blade sections 56b, 58b are coupled to the distal end of the respective inner blade extender sections 56a, 58a. In general, the inner blade extender sections 56a, 58a are rigidly connected to the wind turbine hub 55, and act to increase the swept area of the blades 56, 58, and consequently increase the power rating of the wind turbine 50.

Blade extenders (also called hub extenders) normally do not contribute to the lifting forces of the wind turbine, and consequently do not usually have a substantially aerodynamic profile (in many cases, blade extenders can be simply rigid cylindrical members). However, the embodiment shown in FIG. 5 shows the inner blade extender sections 56a, 58a as having an extended aerodynamic trailing edge 57. This may be in the form of a shaped surface of the blade extender sections 56a, 58a; an aerodynamic fairing may be fitted over a cylindrical blade extender; or additional elements e.g. fins may be attached to a regular cylindrical blade extender to form a more aerodynamic profile. It will be understood that any suitable arrangement of blade extender may be employed in the system of the invention, with or without an aerodynamic trailing edge 57.

A pitch system (not shown) is provided in the wind turbine 50, preferably in the form of separate pitching apparatus in both wind turbine blades 56, 58, the pitching apparatus located at the interface between the respective blade extender sections 56a, 58a and the outer blade sections 56b, 58b. The pitch system/pitching apparatus is operable to pitch the outer blade sections 56b, 58b of the blades 56, 58 relative to the inner blade extender sections 56a, 58a. A partial-pitch turbine allows for the pitch of the outer blade sections to be adjusted to control the power output of the turbine generator.

The wind turbine 50 further comprises a control system (not shown). The control system may be provided at the turbine 50 location, or may be provided at a remote control station, wherein it may co-ordinate the operation of a plurality of similar two-bladed partial-pitch wind turbines.

The control system may be coupled with a system for monitoring the environmental conditions at or in the region of the wind turbine 50. This may be for example any suitable devices for monitoring weather conditions and/or related elements, e.g. atmospheric pressure, wind speed, etc. Furthermore, use may be made of available weather forecasting services in the region of the wind turbine. Such a monitoring system may be able to detect current atmospheric conditions at the wind turbine 50 location, or may be able to forecast the arrival of extreme wind conditions at the wind turbine 50, based on available meteorological information.

By extreme wind conditions is it understood that this relates to wind shear events, peak wind speeds due to storms, and conditions which can lead to rapid changes in wind direction. It will be understood that the definition of an extreme wind condition for a wind turbine site can depend on several factors, e.g. the maximum wind speed rating for the desired class of wind turbine for that site, and/or the wind speed which would be classified as a once in 10/50/100 years event (relative to the normal prevailing wind conditions at the wind turbine site).

For most regions in Europe, a wind speed of greater than 20 meters per second (m/s) may be regarded as an extreme wind condition. Therefore, a wind turbine structure for such a location may be configured such that said step of pitching occurs for winds in excess of 20 m/s, the wind turbine structure designed according to such a wind speed rating.

However, in typhoon- or hurricane-prone regions in Asia, such a turbine may need to be rated to withstand winds of up to 70 m/s. Thus, the design of the turbine structure may involve more use of reinforcement elements. For such a reinforced turbine, an extreme wind condition would be at a higher level than in the case of a European-based turbine. In general, a weather system comprising sustained winds of at least 33 meters per second (or 119 km/hour) is classified as a typhoon or hurricane.

When an extreme wind condition is detected at, or forecasted for, the site of the wind turbine 50, the control system is operable to initiate a process or "safety mode" for the wind turbine 50, thereby reducing the extreme loads which will be experienced by the wind turbine structure.

Preferably, the wind turbine "safety mode" or safety procedure is initiated when the wind speeds at the turbine exceed approximately 25 m/s.

Firstly, the rotation of the wind turbine blades 56, 58 is stopped. This is accomplished by pitching the outer blade sections 56b, 58b relatively slowly into a feathered position, while the generator rpm and power output decreases. A feathered position is when an airfoil is rotated to be parallel to the oncoming airflow. Accordingly, the lift generated by the airfoil is reduced, slowing the rotation of the wind turbine blades 56, 58. Preferably, the outer blade sections 56b, 58b are pitched at a rate of approximately 2 degrees per second. Once the generator rpm/power falls below a specified limit (for example, 3-4 rpm), the generator is disconnected from the power grid, and the blade sections 56b, 58b are further pitched into the feathered position.

Figure 6:
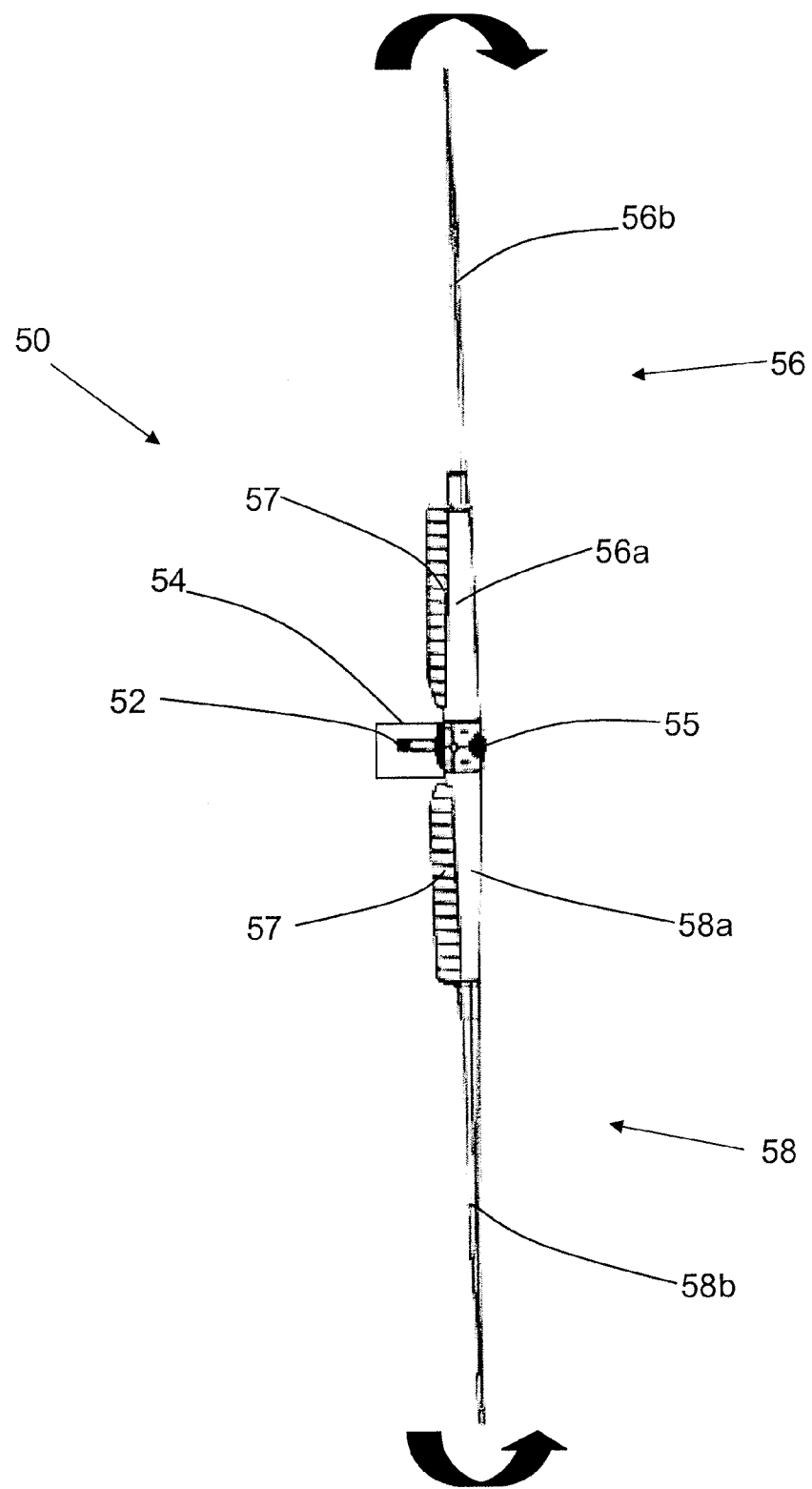
FIG. 6 is a top plan view of the wind turbine of FIG. 5 when controlled in an extreme wind condition.

The wind turbine blades 56, 58 will eventually reach a steady-state equilibrium position, normally in a substantially horizontal stand still position. At this point, the control system can be operable to instruct the pitch system to pitch the outer blade sections 56b, 58b relative to the inner blade extender sections 56a, 58a, such that the pitch angle of the outer blade sections 56b, 58b is substantially orthogonal to the pitch angle of the blade extender sections 56a, 58a, as shown in FIG. 6. It will be understood that this pitching of the outer blade sections 56b, 58b is performed simultaneously, in order to maintain balance in the general wind turbine structure.

It will be understood that the step of pitching the blade sections 56b, 58b may be combined with the step of feathering the blade sections 56b, 58b.

It will also be understood that the wind turbine 50 may further comprise a brake (not shown) which may be applied to the rotor of the wind turbine 50 to prevent or impede rotation of the rotor blades 56, 58. Such a brake may be an electrical brake and/or a mechanical brake.

In FIG. 6, the inner blade extender sections 56a, 58a (being fixed) have an aerodynamic profile substantially in line with the oncoming airflow (i.e. in line with the surface of the page as viewed in FIG. 6). The outer blade sections 56b, 58b have a pitch angle substantially orthogonal to the inner blade sections 56a, 58a (i.e. coming out of the page as viewed in FIG. 6).

Figure 4:
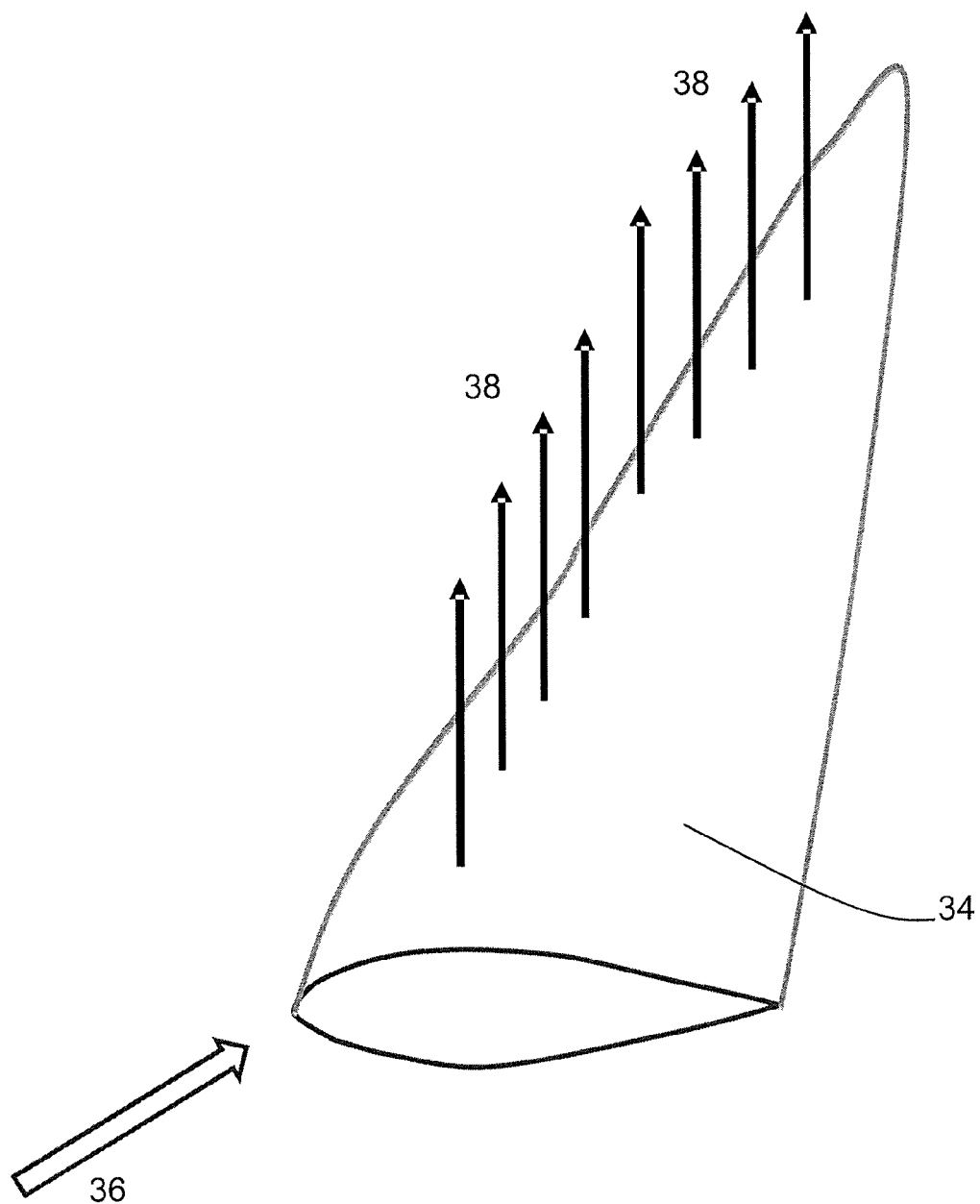
FIG. 4 is a perspective view of one of the blades of the turbine of FIG. 3.
Figure 7:
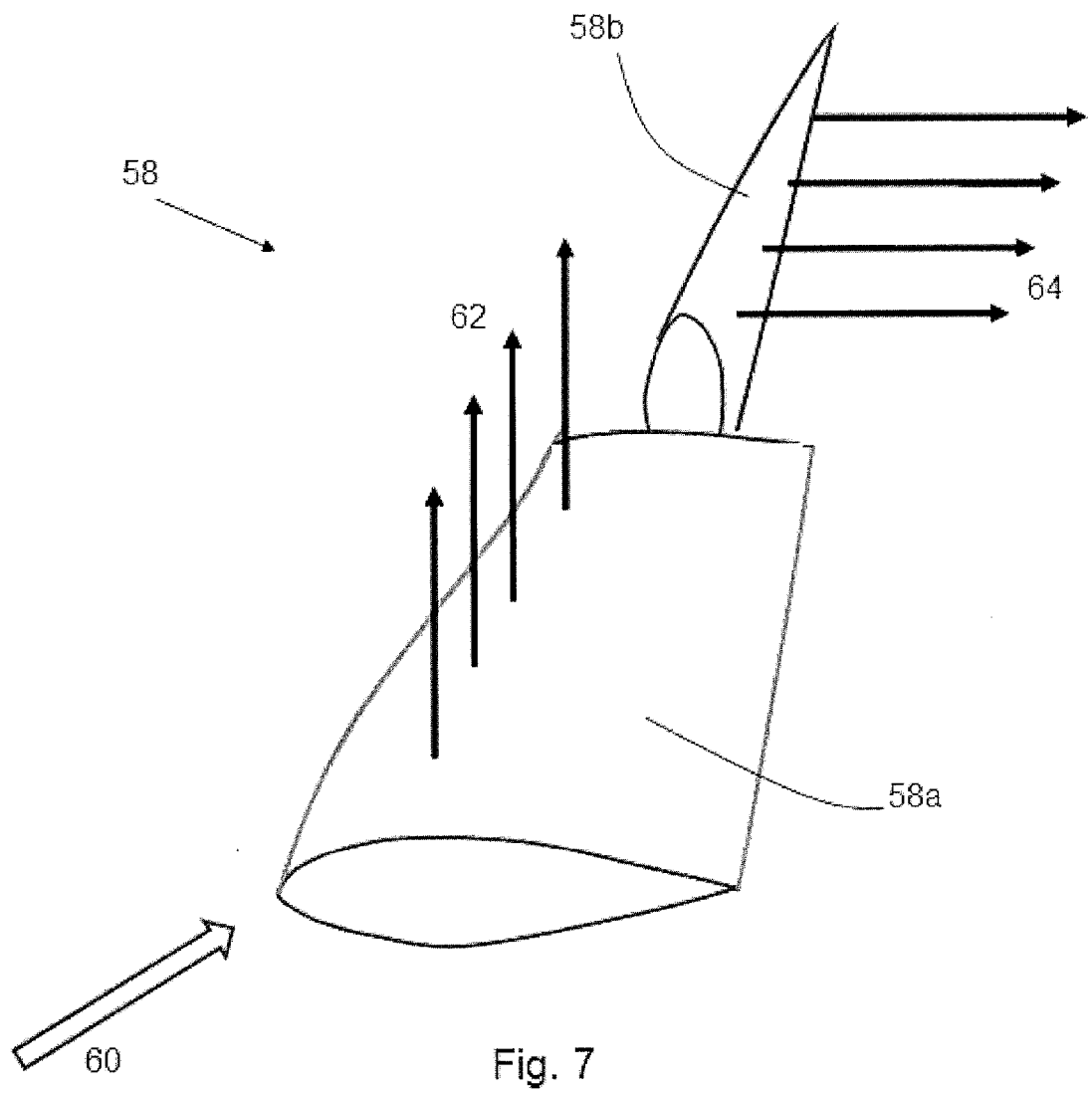
FIG. 7 is perspective view of the second rotor blade of FIG. 6.

With reference to FIG. 7, an enlarged perspective view of the second blade 58 is shown, seen from the position of the wind turbine hub 55 of FIG. 6. As the second outer blade section 58b is substantially orthogonal to the second inner blade extender section 58a, this results in a different distribution of forces about the blade 58 due to the oncoming high wind forces, than say, the blade shown in FIG. 4.

The oncoming wind (indicated by arrow 60) acts on the inner blade extender section 58a to produce a lift force 62 along the length of the blade extender section 58a. As the outer blade section 58b is orthogonal to the blade extender section 58a, the oncoming wind 60 has a different angle of attack on this section of the blade 58, and produces a corresponding drag force 64 along the length of the outer blade section 58b. The wind turbine 50 is arranged such that the total lift force 62 along the length of the blade extender section 58a is substantially equal in magnitude but orthogonal in direction to the total drag force 64 along the length of the outer blade section 58b.

Figure 1:
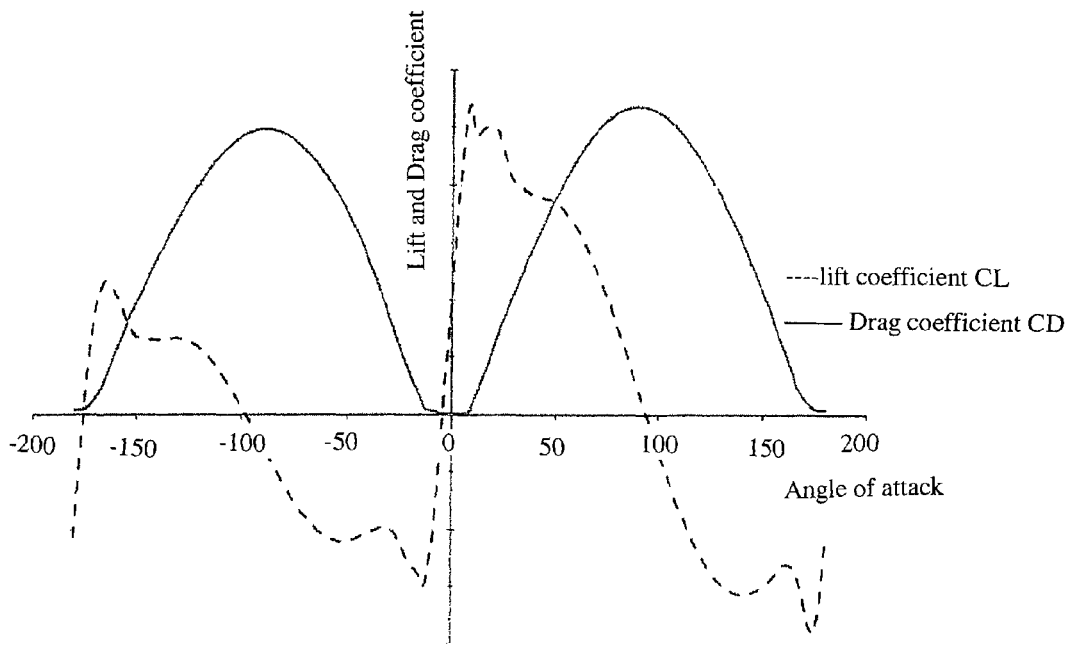
FIG. 1 is a graph of the variation of the lift coefficient and the drag coefficient against angle of attack for a standard three-bladed turbine.
Figure 2:
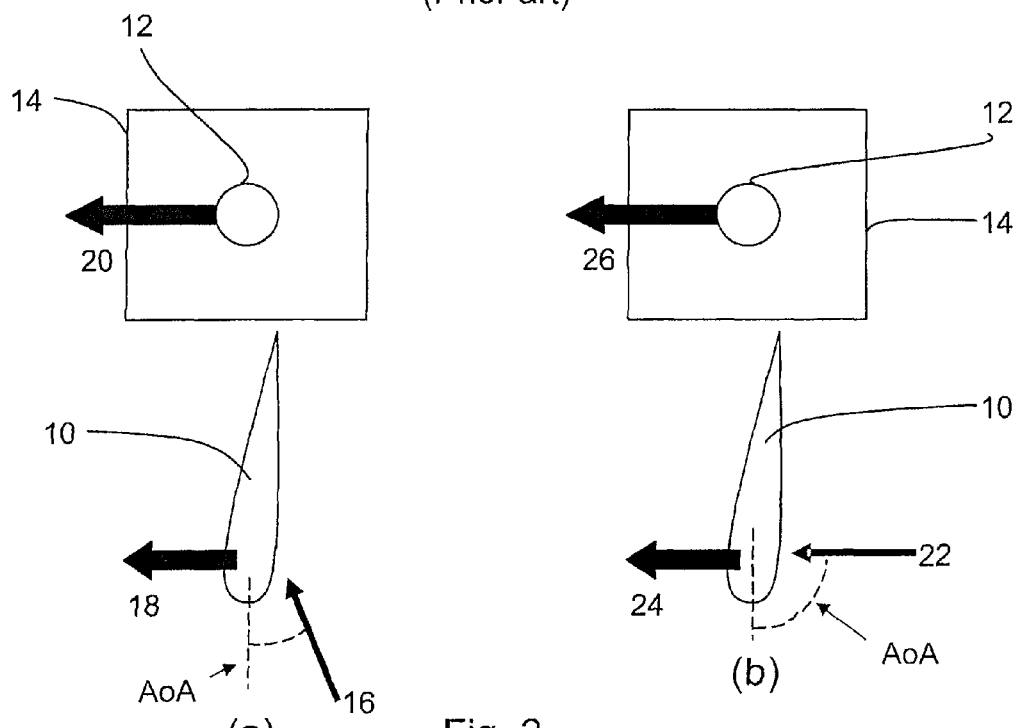
FIG. 2 is an illustrative drawing of the forces acting on a wind turbine structure during high wind conditions.
Figure 3:
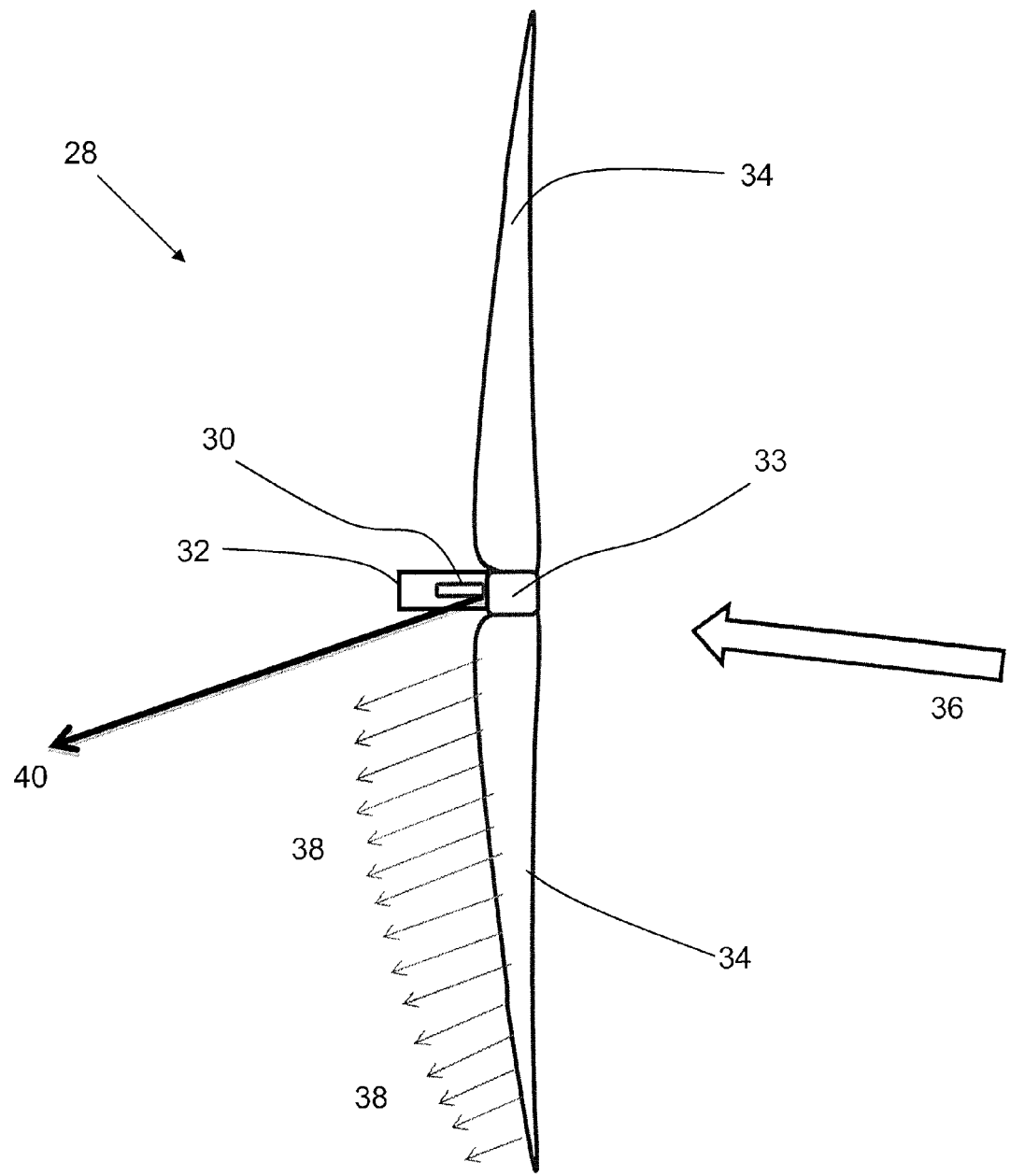
FIG. 3 is a top plan view of a prior art two-bladed wind turbine during high wind conditions.
Figure 8:
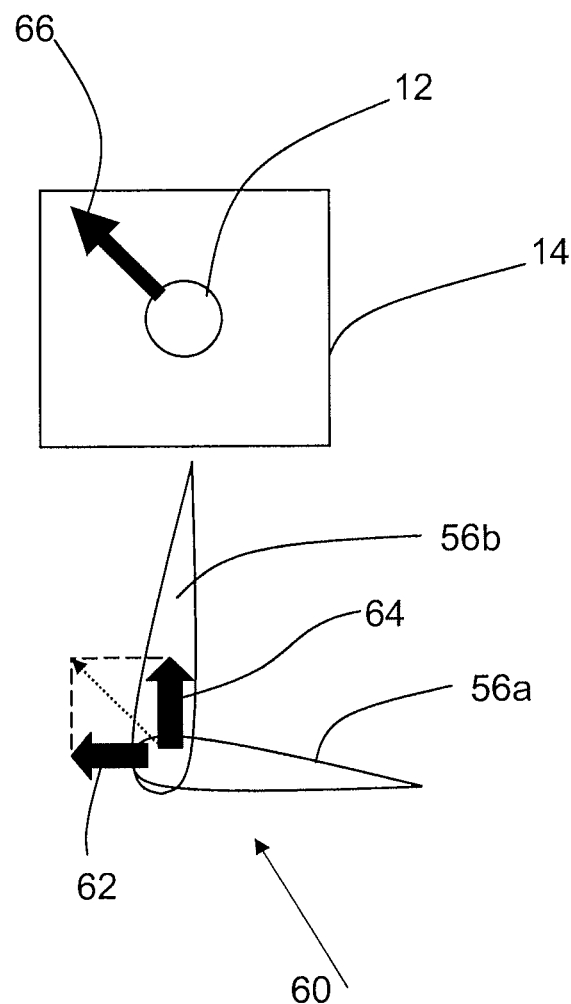
FIG. 8 is an illustrative drawing of the forces acting on the wind turbine of FIG. 6 during an extreme wind condition.

Turning to FIG. 8, this illustrative sketch demonstrates the forces acting on the first blade 56, and the resultant effect on the wind turbine structure 50. As the lift force 62 generated on the first outer blade section 56b and the lift force 64 generated on the first inner blade extender section 56a are orthogonal to one another, and as the resultant thrust force experienced by the wind turbine tower 12 and nacelle 14 is a vector product (indicated in FIG. 8 by arrow 66) of these forces, this results in a reduced extreme thrust force 66 acting on the wind turbine structure due to the high wind conditions, compared to the prior art systems illustrated in FIG. 2. As the forces 62 and 64 are substantially equal but in orthogonal directions, this means that the resultant vector force 66 experienced by the wind turbine structure and foundation is minimised.

It has been tested that such an orthogonal arrangement of blade sections on a partial-pitch turbine during high wind conditions can result in a reduction in the peak thrust loads experienced by the wind turbine foundations to approximately 60% of the value of corresponding thrust loads experienced by a full-pitch bladed turbine.

As the structural loads experienced by the wind turbine structure for such defined extreme wind conditions can be reduced, this means that a wind turbine designed to meet a certain IEC class can be redesigned to require less structural reinforcement. This means that the wind turbine components (e.g. tower, nacelle, foundations, etc.) may be redesigned to need less materials in order to meet the reduced loading requirements.

Such reduced construction requirements can result in considerable cost savings regarding construction materials, construction time, weight of components, foundation requirements, etc., and allows for the overall turbine cost to be reduced.

Figure 9:
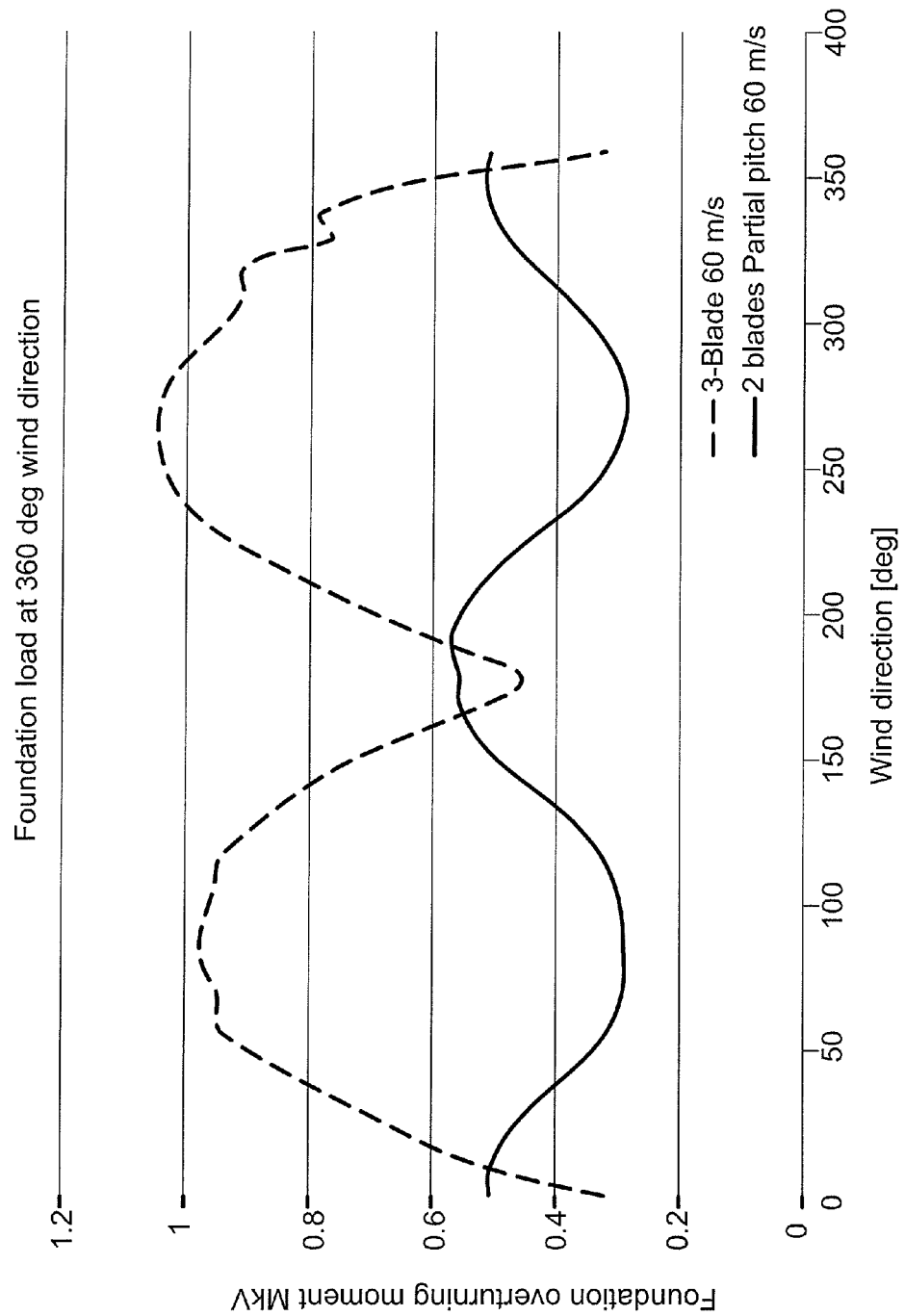
FIG. 9 is a graph of sample foundation loads experienced during 60 m/s wind in a standard three-bladed turbine and in a two-blade partial-pitch turbine controlled according to the invention.

FIG. 9 shows a plot of thrust loads acting on sample wind turbine foundations when exposed to winds of 60 m/s speed, as the angle of wind direction is varied. The dashed line indicates the loads experienced by a traditional three-bladed full-pitch wind turbine, while the solid line indicates the measured loads for a two-bladed partial-pitch wind turbine according to the invention (i.e. having orthogonally-pitched outer blade sections). As can be seen from the graph, a two-bladed partial-pitch wind turbine used in the manner described above experiences reduced extreme thrust loads in the wind turbine foundation compared to the known designs—from an extreme thrust load of approximately 1.05 unit loading for a standard three-bladed turbine, to a maximum thrust load of approximately 0.56 unit loading for the turbine of the invention.

In order to provide for an equal distribution of loads throughout the wind turbine rotor blades 56, 58, preferably the rotor blades are designed such that the surface area of the inner blade extender sections 56a, 58a is substantially equal to the surface area of the outer blade sections 56b, 58b. This ensures that the lift/drag forces generated by each of the blade components are substantially equal, and provide for the best distribution of load in the rotor blades 56, 58.

Preferably, the inner blade extender sections are designed as stall-controlled blade sections, while the outer blade sections are designed as pitch controlled blade sections. In a stall-controlled blade, the rotor blade profile is aerodynamically designed to ensure that the moment the wind speed exceeds a preferred speed, the blade design induces turbulence on the suction side of the blade. This stall prevents the lifting force of the rotor blade from acting on the rotor. In a pitch-controlled blade, the effect of excessive wind speed on the rotor blades can be modulated by pitching the blades out of the wind in order to reduce lift.

Preferably, the rotor blades 56, 58 are designed such that the blade extender sections 56a, 58a comprise approximately between 20%-50% of the entire rotor radius, preferably approximately ⅓ of the rotor radius. As the chord line of the inner blade extender sections 56a, 58a is normally longer than the chord line of the outer blade sections 56b, 58b, this allows for a more even distribution of the lift forces acting on the rotor blades 56, 58. (It should be noted that, due to the tapered nature of rotor blades, this does not exclude embodiments wherein the surface area of the inner and outer sections are substantially equal.)

Once the extreme wind condition has passed, and provided that no repair or maintenance work is require for the wind turbine or the greater power grid, the turbine may be operable to pitch the outer blade sections 56b, 58b out of said relatively orthogonal position, and to start up the turbine operation and power generation.

While the occurrence of extreme wind conditions may result in a lack of power at the turbine location (e.g. due to damage to or failure of the connecting power grid), it will be understood that further enhancements to the method of operation of the turbine may be provided for in the case of a powered turbine (i.e. a turbine that still has a connection to the power grid and/or a turbine that comprises a local power supply source).

In one feature, the turbine may be operable to make minor adjustments to the pitch angles between the blade sections, in order to improve the distribution of loads throughout the blade sections. This may be required due to variations in the wind speed and/or direction at the turbine. An optimal distribution of loads throughout the blade sections results in a minimised thrust loading on the wind turbine structure.

Such minor adjustments may be determined by measuring the loading experienced by the greater wind turbine structure, e.g. the tower, the nacelle, the hub, and/or the loading experienced by the different sections of the blades, e.g. if one section is experiencing increased loads, the pitch angles of the blade sections can be adjusted until the loads are evenly distributed throughout all of the sections. To this end, the turbine may comprise load sensors present in the wind turbine structure or in different sections of the rotor blades, the output of said sensors used to determine the preferred pitch angle adjustment for the pitchable blade sections, preferably in a feedback control system. Preferably, said load sensors comprise any suitable load cell transducers, e.g. strain gauges, hydraulic load cells, piezoelectric load cells, vibrating wire load cells, etc.

In an additional or alternative feature, while some embodiments may lock the yaw of the turbine into position during an extreme wind condition, the turbine may be further operable to yaw the turbine nacelle, rotor hub, and rotor blades to face into the direction of the wind or to point one of the blades into the wind. To this end, the turbine may further comprise a wind direction sensor, operable to detect the current wind direction, such that the turbine may be yawed accordingly to face into the oncoming wind or as mentioned above to point one blade into the wind.

While the above embodiments describe the pitchable sections of the rotor blades as being the outer sections of a rotor blade, it will be understood that said pitchable sections may be provided at any position along the length of a rotor blade.

As the cost and effort of constructing off-shore foundations are one of the most important factors in the construction of off-shore wind turbines, the invention provides particular advantages in this area, as the foundation requirements may be minimised to account for the reduction in the thrust loading experienced by the wind turbine structure and foundation. Examples of suitable off-shore foundations which may be optimised for the invention include mono pile foundations, tripod foundations, gravity foundations, suction foundations, etc. As the thrust loading for a turbine operated according to the invention can be reduced to approximately 60% of the loading experienced by prior art turbines, corresponding savings can be made in the structural requirements of the wind turbine structure and foundation.

It will be understood that while the invention is described in relation to an upwind-style turbine, it may also be used in the context of a downwind-style turbine design.

The invention is not limited to the embodiment described herein, and may be modified or adapted without departing from the scope of the present invention.

The invention claimed is:

1. A method of controlling a partial-pitch wind turbine during an extreme wind condition, the wind turbine comprising a wind turbine tower, a wind turbine foundation and at least two wind turbine rotor blades installed on a rotor at a nacelle, said wind turbine comprising a yaw system for yawing said rotor in relation to a wind direction, said yaw system being installed between said nacelle and said tower, wherein said wind turbine rotor blades comprise a first blade section and a second blade section, said second blade section being longer than the first blade section and being pitchable relative to said first blade section, the method comprising the step of:

for an extreme wind condition, locking said yaw system and pitching said second blade sections of said wind turbine rotor blades such that said second blade section is pitched at a substantially orthogonal pitch angle relative to said first blade section to reduce the magnitude of the extreme loading experienced by the wind turbine tower and foundation, wherein said step of pitching is arranged such that the force generated on said second blade section by the oncoming wind is substantially equal in magnitude but orthogonal in direction to the force generated on said first blade section by the oncoming wind.

2. The method of claim 1, wherein the method further comprises the step of stopping the rotation of said wind turbine rotor blades.

3. The method of claim 2, wherein said step of stopping comprises pitching said second blade sections of said wind turbine rotor blades to a feathered position.

4. The method of claim 1, wherein the method further comprises the step of letting the wind turbine rotor blades idle.

5. The method of claim 4, wherein the step of letting the wind turbine rotor blades idle comprises applying a brake to the wind turbine to impede the rotation of the said wind turbine blades.

6. The method of claim 1, wherein said step of pitching comprises rotating said second blade sections of said wind turbine rotor blades such that the pitch angle between said second blade sections and said first blade sections is between 80°-100°.

7. The method of claim 1, wherein said step of pitching is performed such that each of said second blade sections are simultaneously pitched to be substantially orthogonal to said first blade sections.

8. The method of claim 1, wherein the method further comprises the step of iteratively adjusting the pitch angle of said second blade section subsequent to said pitching step, to minimise the magnitude of the extreme loading experienced by the wind turbine during an extreme wind condition.

9. The method of claim 8, wherein the method further comprises the step of monitoring the loading experienced by the wind turbine structure, and wherein said pitch angles are adjusted based on said monitored loading.

10. The method of claim 8, wherein the method further comprises the step of monitoring the loading experienced by at least one of said blade sections, and wherein said pitch angles are adjusted based on said monitored loading.

11. A partial-pitch wind turbine having at least two wind turbine rotor blades with a length of at least 35 metres, the wind turbine comprising:
- a wind turbine tower provided on a wind turbine foundation;
- a wind turbine nacelle provided at an upper end of said tower;
- a hub provided at said nacelle;
- at least two wind turbine rotor blades, said rotor blades being installed on a rotor at the nacelle and comprising a first blade section and a second blade section;
- a yaw system for yawing said rotor in relation to a wind direction, said yaw system being installed between said nacelle and said tower and
- a pitching system configured to pitch said second blade sections relative to said first blade sections, wherein the wind turbine further comprises a control system coupled to said pitching system, said control system further being coupled to said yaw system, said control system being configured to reduce the magnitude of the extreme loading experienced by said wind turbine tower and foundation by locking said yaw system and by pitching said second blade sections at a substantially orthogonal pitch angle to said first blade sections for an extreme wind condition, such that the force generated on said second blade section by the oncoming wind is substantially equal in magnitude but orthogonal in direction to the force generated on said first blade section by the oncoming wind, wherein said at least two wind turbine rotor blades are configured such that the surface area of said first blade sections and the surface area of said second blade sections is equal with said first blade sections constituting 20 percent to 50 percent of the length of the entire rotor blade such that each section experiences an equal amount of force.

12. The wind turbine of claim 11, wherein said first blade section is configured as a stall-controlled wind turbine blade section and said second blade section is configured as a pitch-controlled wind turbine blade section.

13. The wind turbine of claim 11, wherein said first blade section comprises an inner blade extender section coupled to said hub and said second blade section is an outer pitchable blade section coupled to the distal end of said inner blade extender section.

14. The wind turbine of claim 11, wherein the wind turbine further comprises at least one load sensor provided in said wind turbine tower, wherein said control system is operable to adjust the pitch angles of said second blade sections relative to said first blade sections during an extreme wind condition based on the output of said at least one load sensor to reduce the magnitude of the extreme loading experienced by the wind turbine.

15. The wind turbine of claim 11, wherein the wind turbine further comprises at least one load sensor provided in said first and second blade sections, wherein said control system is operable to adjust the pitch angles of said second blade sections relative to said first blade sections during an extreme wind condition based on the output of said at least one load sensor to reduce the magnitude of the extreme loading experienced by the wind turbine.

16. The wind turbine of claim 11, wherein said wind turbine is an off-shore turbine, and wherein said wind turbine foundation is chosen from one of the following: a mono pile foundation; a tripod foundation; a gravity foundation; a suction foundation.

* * * * *